UNITED STATES PATENT OFFICE.

GEORG EGLY, OF CHARLOTTENBURG, GERMANY, ASSIGNOR TO GEBRÜDER SIEMENS & CO., OF CHARLOTTENBURG, NEAR BERLIN, GERMANY.

PROCESS FOR THE MANUFACTURE OF SOLID FORMS.

No. 866,444.     Specification of Letters Patent.     Patented Sept. 17, 1907.

Application filed December 2, 1905. Serial No. 290,027.

*To all whom it may concern:*

Be it known that I, GEORG EGLY, a subject of the German Emperor, residing at 70 Kantstrasse, Charlottenburg, near Berlin, in the German Empire, chemist, have invented certain new and useful Improvements in Processes for the Manufacture of Solid Forms, of which the following is a specification.

This invention relates to a process for the manufacture of forms such as rods, tubes or disks, of high electrical conductivity and great mechanical, thermal and chemical resistance, which can advantageously be used as electrical heating bodies and for other purposes, such as for example, those requiring high mechanical resistance and hardness, like the manufacture of grindstones.

The process consists in mixing the material from which the form is to be made, with more or less silicon, and if necessary with an agglutinant for obtaining the right degree of plasticity; the desired form is fashioned, such as by pressing, from the mass made in this manner, and is then heated in an atmosphere containing nitrogen, best in pure nitrogen, until a solid form is obtained. The material which is to constitute the foundation of the form may vary greatly in character, so long as it is a material which is not altered when heated to the temperature at which silicon combines with nitrogen. It may be a metal, an electrical conductor of the second class or even a non-conductor. In all cases it must be fire-proof at the temperature to which the form is to be subjected, like silicon carbid, for instance; or at least it must become fire-proof by treatment with silicon, like carbon for instance. The most suitable mixture from which to fashion the form is one of silicon with silicon carbid. These materials are mixed as intimately as possible and treated in the manner already described. If a sufficiently high pressure is used the mass can generally be fashioned to a suitable solid form without the aid of an agglutinant; when, however, one is necessary various sorts of agglutinants may be used to facilitate the fashioning of the form. There may be used an agglutinant which is either completely volatilized by the high temperature to which the form is afterwards subjected, or completely or partially left in the mass, for instance an agglutinant which is carbonized when heated, such as tar or the like.

The fashioned form is introduced into a suitable furnace and heated for a considerable time in an atmosphere of nitrogen. The finished form contains a considerable proportion of nitrogen combined with the silicon, while the silicon carbid, which in this instance has been mixed with the silicon, has remained unchanged and is strongly cemented by the silicon nitrid to form a dense body. When an agglutinant that is capable of being carbonized is used, there is formed, according to the proportion of the carbon thus introduced, a compound of the composition $C_2Si_2N$. If a proportion of carbon corresponding with this formula be added to the silicon, there is obtained a very solid mass which conducts well and consists in the main of the compound $C_2Si_2N$; this compound, like the silicon nitrid firmly cements the silicon carbid, for instance, with which it may be mixed.

The forms produced according to this invention have surprising properties. They can be heated in the open air to very high temperatures, such as 1000° C. and higher, without being in the slightest degree changed. They are remarkably dense, hard and of high resistance; they may be used, for example, instead of carborundum for grindstones and the like. They have unexpected electrical conductivity and on this account, together with their aforesaid mechanical thermal and chemical resistance, are specially adapted for use as electrical heating bodies.

A rod consisting of $C_2Si_2N$, as described above, 125 cm. long and 1 square cm. in cross-section, has an electrical resistance of about 1 ohm. If the rod be fashioned from a mixture of 70 parts of silicon carbid and 30 parts of silicon and be heated in nitrogen in the manner described, it will have for the above dimensions, a resistance of about 20 ohms. If the mass consists of 70 parts of silicon carbid and 30 parts of silicon be mixed with 10 parts of clay, a rod of the same dimensions will have a resistance of about 70 ohms. On the other hand, if silicon carbid were mixed with 10 per cent of clay without any silicon and burned in the ordinary manner, the form produced would have a very high resistance, namely about 1000 ohms, and mechanical properties much inferior to those of the forms made with aid of silicon and nitrogen according to the present invention.

Having now described the nature of my said invention and the best means I know of carrying the same into practical effect, I claim:—

1. A process for the manufacture of solid forms which consists in mixing silicon with a material which is inert at temperatures up to that at which silicon combines with nitrogen, fashioning the mixture into a form, and heating the form in an atmosphere containing nitrogen.

2. A process for the manufacture of solid forms which consists in mixing silicon with silicon carbid, fashioning the mixture into a form, and heating the form in an atmosphere containing nitrogen.

3. A process for the manufacture of solid forms which consists in mixing silicon with a material which is inert at temperatures up to that at which silicon combines with nitrogen and with an agglutinant, fashioning the mixture into a form, and heating the form in an atmosphere containing nitrogen.

4. A process for the manufacture of solid forms which consists in mixing silicon with silicon carbid and an agglutinant, fashioning the mixture into a form, and heating the form in an atmosphere containing nitrogen.

5. A process for the manufacture of solid forms which consists in mixing silicon with a material which is inert at temperatures up to that at which silicon combines with nitrogen and an agglutinant that carbonizes when heated, fashioning the mixture into a form, and heating the form in an atmosphere containing nitrogen.

6. A process for the manufacture of solid forms which consists in mixing silicon with silicon carbid and an agglutinant that carbonizes when heated, fashioning the mixture into a form and heating the form in an atmosphere containing nitrogen.

7. A process for the manufacture of solid forms which consists in mixing silicon with an agglutinant that carbonizes when heated, and with a material which is inert at temperatures up to that at which silicon combines with nitrogen, fashioning the mixture into a form, and heating the form in an atmosphere containing nitrogen.

8. A process for the manufacture of solid forms which consists in mixing silicon with a non-metallic substance and with a material which is inert at temperatures up to that at which silicon combines with nitrogen, fashioning the mixture into a form, and heating the form in an atmosphere containing nitrogen.

In testimony whereof I have signed my name to this specification in the presence of two subscribing witnesses.

GEORG EGLY.

Witnesses:
HENRY HASPER,
WOLDEMAR HAUPT.